US007841752B2

(12) United States Patent
Lee

(10) Patent No.: US 7,841,752 B2
(45) Date of Patent: Nov. 30, 2010

(54) LED LIGHTING DEVICE HAVING HEAT CONVECTION AND HEAT CONDUCTION EFFECTS DISSIPATING ASSEMBLY THEREFOR

(75) Inventor: Tsu Lee, Taipei (TW)

(73) Assignee: Pan-Jit International Inc., Koahsiung Hsien (TW)

( * ) Notice: Subject to any disclaimer, the term of this patent is extended or adjusted under 35 U.S.C. 154(b) by 130 days.

(21) Appl. No.: 12/194,509

(22) Filed: Aug. 19, 2008

(65) Prior Publication Data

US 2009/0237932 A1 Sep. 24, 2009

(30) Foreign Application Priority Data

Mar. 18, 2008 (TW) .............................. 97109426 A

(51) Int. Cl.
*B60Q 1/06* (2006.01)

(52) U.S. Cl. ................... 362/373; 362/294; 362/249.02

(58) Field of Classification Search ................. 362/294, 362/373, 640, 649, 650, 647, 646, 545, 249.02, 362/345, 547–549

See application file for complete search history.

(56) References Cited

U.S. PATENT DOCUMENTS 4,630,182 A * 12/1986 Moroi et al. ................ 362/294
2005/0111234 A1 * 5/2005 Martin et al. ............... 362/555
2007/0230188 A1 * 10/2007 Lin ............................ 362/294
2007/0236935 A1 * 10/2007 Wang ......................... 362/294

* cited by examiner

*Primary Examiner*—Jong-Suk (James) Lee
*Assistant Examiner*—Julie A Shallenberger
(74) *Attorney, Agent, or Firm*—Pai Patent & Trademark Law Firm; Chao-Chang David Pai

(57) ABSTRACT

An LED lighting device having heat convection and heat conduction effects has a heat dissipating assembly, a substrate, multiple LEDs and a base. The heat dissipating assembly has a housing and an outer cover. The housing has multiple air holes. The outer cover is mounted on an open top of the housing and has multiple through holes and an exterior flue protruding from the outer cover and extending into the housing. The substrate is mounted inside the housing against the outer cover and has a hole allowing the exterior flue to extend therethrough. The LEDs are mounted on the substrate and respectively correspond to the through holes. The base is attached to a bottom of the housing. The exterior flue encourages heated air to move through the exterior flue and flow out of the housing via the air holes. With such continuous and directional air movement, the LED lighting device obtains good heat-dissipating efficiency.

18 Claims, 6 Drawing Sheets

LED LIGHTING DEVICE HAVING HEAT CONVECTION AND HEAT CONDUCTION EFFECTS DISSIPATING ASSEMBLY THEREFOR

BACKGROUND OF THE INVENTION

1. Field of the Invention

The present invention relates to an LED lighting device, especially to an LED lighting device with a heat-dissipating assembly providing high heat dissipating efficiency with directional convection.

2. Description of the Related Art

A Light-Emitting Diode (LED) is a semiconductor element that converts electricity into light and is often used as a light source. An LED lighting device lights up quickly, generates more light per watt than an incandescent lamp and has a relatively long life span. Furthermore, an LED lighting device is difficult to damage with external shocks when compared with traditional fluorescent and incandescent bulbs.

Operating performance of an LED lighting device largely depends on a surrounding temperature. When the LED lighting device is active in high surrounding temperatures overheating and device failure may occur. Therefore, the LED lighting device requires sufficient heat dissipation to maintain a long life span. A conventional way to dissipate heat of the LED lighting device is using multiple metallic fins mounted around the LED lighting device so as to increase a surface area for heat conduction. However, low heat convection allows high-temperature air around the fins to lower a heat dissipating efficiency.

To overcome the shortcomings, the present invention provides an LED lighting device with a heat-dissipating assembly providing high heat dissipating efficiency with directional convection to mitigate or obviate the aforementioned problems.

SUMMARY OF THE INVENTION

The main objective of the invention is to provide an LED lighting device with a heat-dissipating assembly providing high heat-dissipating efficiency with directional convection.

An LED lighting device in accordance with present invention comprises a heat dissipating assembly, a substrate, multiple LEDs and a base. The heat dissipating assembly has housing and outer cover. The housing has multiple air holes being formed through the housing. The outer cover is mounted on an open top of the housing and has multiple through holes and an exterior flue protruding from the outer cover and extending into the housing. The substrate is mounted inside the housing, against the outer cover and has a hole allowing the exterior flue of the outer cover to extend therethrough. The LEDs are mounted on the substrate and respectively correspond to the through holes of the outer cover. The base is attached to a bottom of the housing.

When the LED lighting device lights up, the exterior flue will continually force heated air to directionally move into the exterior flue due to the stack effect. The heating air will move into the housing and finally flow out via the air holes. With such continuous and directional air movement, the LED lighting device obtains good heat-dissipating efficiency.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
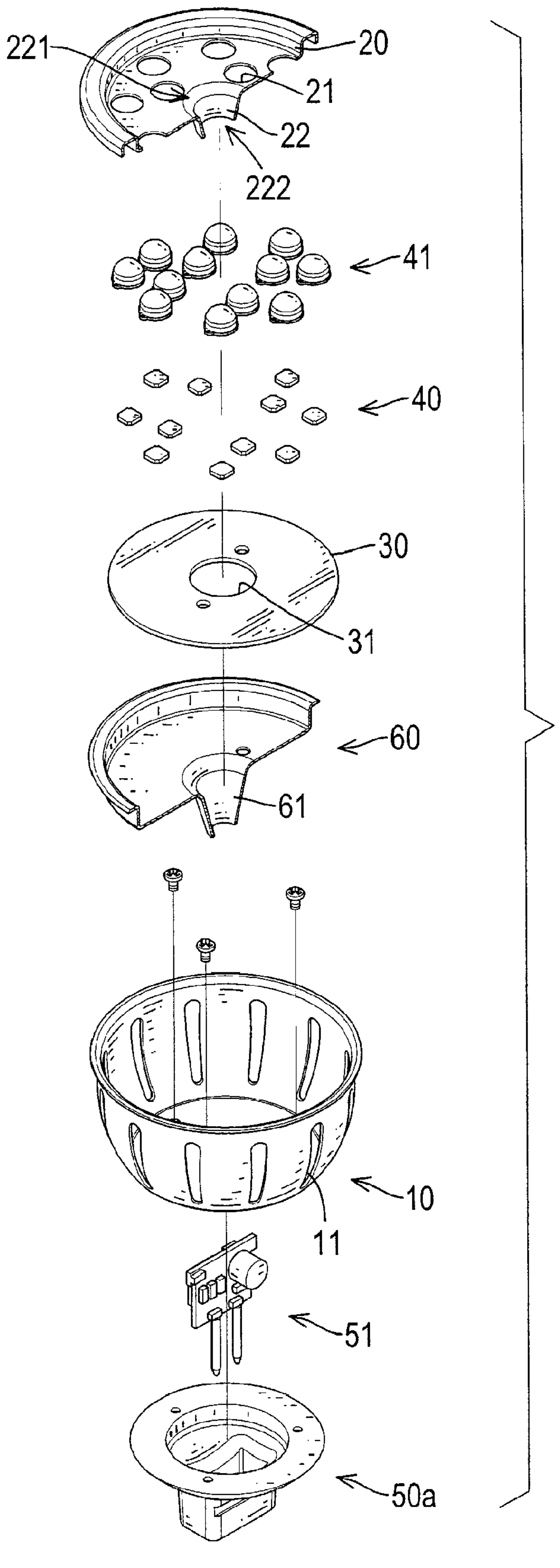
FIG. 1 is an exploded perspective view of an LED lighting device in accordance with the present invention.
Figure 2:
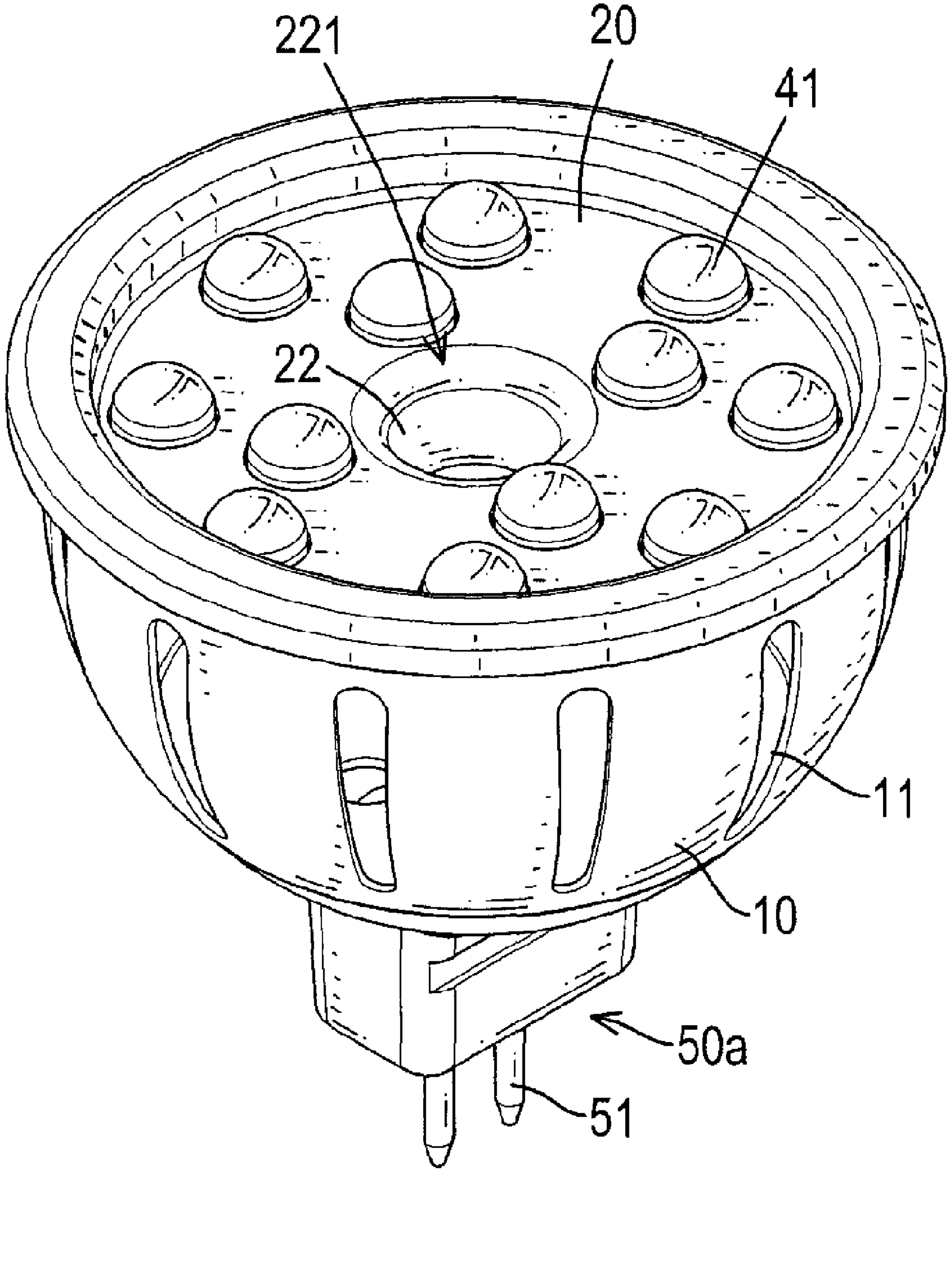
FIG. 2 is a perspective view of the LED lighting device in FIG. 1.

With reference to FIGS. 1, 2, 4, 5 and 6, an LED lighting device in accordance with the present invention comprises a heat dissipating assembly, a substrate (30), multiple LEDs (40), a base (50*a*, 50*b*) and may have a control module (51), a converter (70), a contact cap (71) and multiple condensers (80).

The heat dissipating assembly comprises a housing (10), an outer cover (20) and an optional inner cover (60).

The housing (10) is heat conductive and has an open top, a bottom and multiple air holes (11) being formed through the housing (10) and may be bowl-shaped and metallic and may be made of aluminum.

The outer cover (20) is heat conductive and mounted on the open top of the housing (10) and has multiple through holes (21) and an exterior flue (22) and may be metallic and may be made of aluminum. The exterior flue (22) protrudes from the outer cover (20) and extends into the housing (10) and has an outer open end (221) and an inner open end (222). The outer open end (221) is formed through the outer cover (20). The inner open end is opposite to the outer open end (221) and extends toward the bottom of the housing (10).

The inner cover (60) is heat conductive and mounted in the housing (10), is connected to the outer cover (20) and has an interior flue (61) and may be metallic and may be made of aluminum. The interior flue (61) protrudes from the inner cover (60), is mounted around the exterior flue (22) of the outer cover (20) and has an outer open end (611) and an inner open end (612). The outer open end (611) is formed through the inner cover (60) and corresponds to the outer open end (221) of the exterior flue (22). The inner open end (612) is opposite to the outer open end (611) of the inner cover (60) and extends toward the bottom of the housing (10).

The substrate (30) is mounted inside the housing (10), is disposed against the outer cover (20), may be mounted between the outer cover (20) and the inner cover (60) and has a hole (31). The hole (31) is formed through the substrate (30), corresponds to the outer open end (221) of the outer cover (20) and is mounted around the exterior flue (22) of the outer cover (20).

The LEDs (40) are mounted on the substrate (30), respectively correspond to the through holes (21) of the outer cover (20). Each LED may have a lens (41) being mounted on the LED (40), aligning with and may extend into a corresponding through hole (21) of the outer cover (20).

The base (50*a*, 50*b*) is attached to the bottom of the housing (10) and may have an inner side and an outer side.

The control module (51) is mounted in the base (50*a*) and has two pins extending through the base (50*a*).

The converter (70) is mounted on the inner side of the base (50*b*) between base (50) and the bottom of the housing (10) and powers the LEDs.

Figure 5:
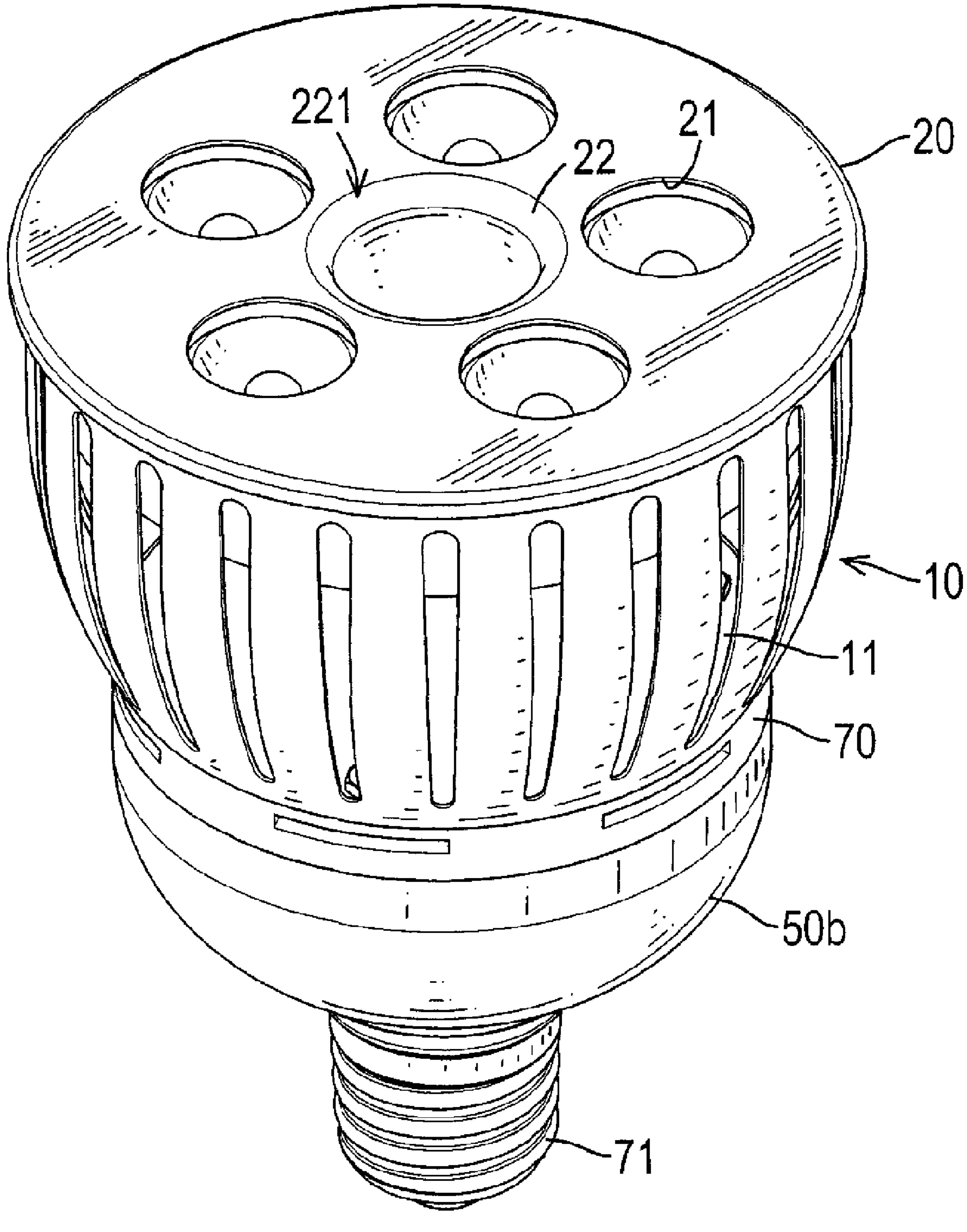
FIG. 5 is a perspective view of the LED lighting device in FIG. 4.
Figure 6:
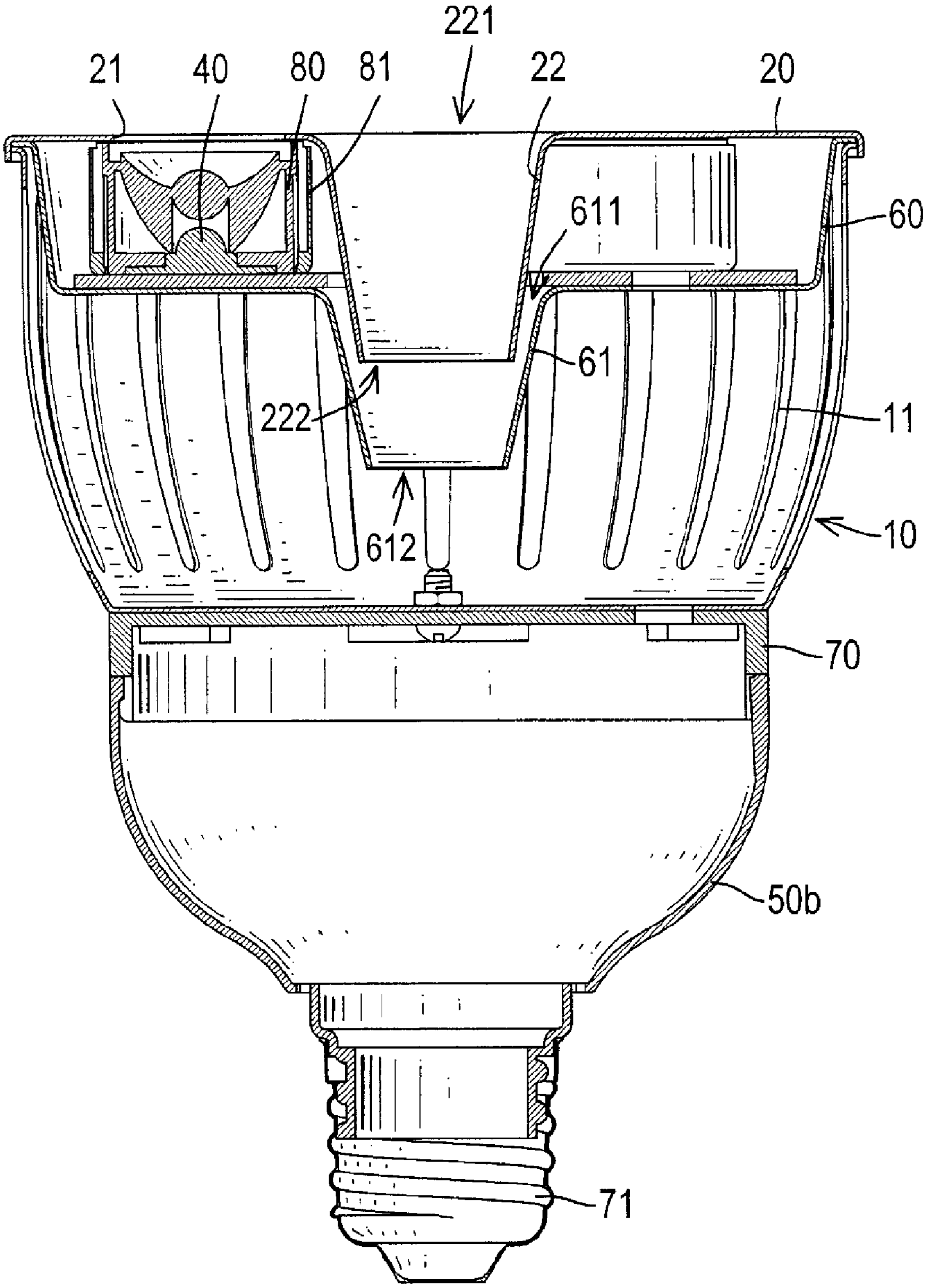
FIG. 6 is a side view in partial section of the LED lighting device in FIG. 5.

With further reference to FIG. 5, the contact cap (71) is mounted on the outer side of the base (50*b*), electrically connects to the converter (70) and is adapted to connect to an external power source. The external power source may be connected via a lamp fitting, spot-light fitting, wall-socket fitting or the like.

The condensers (80) are respectively mounted around the LEDs (40) to concentrate lights and each condenser (80) further has a shell (81) being mounted around the condenser (80) and on the substrate (30).

Figure 3:
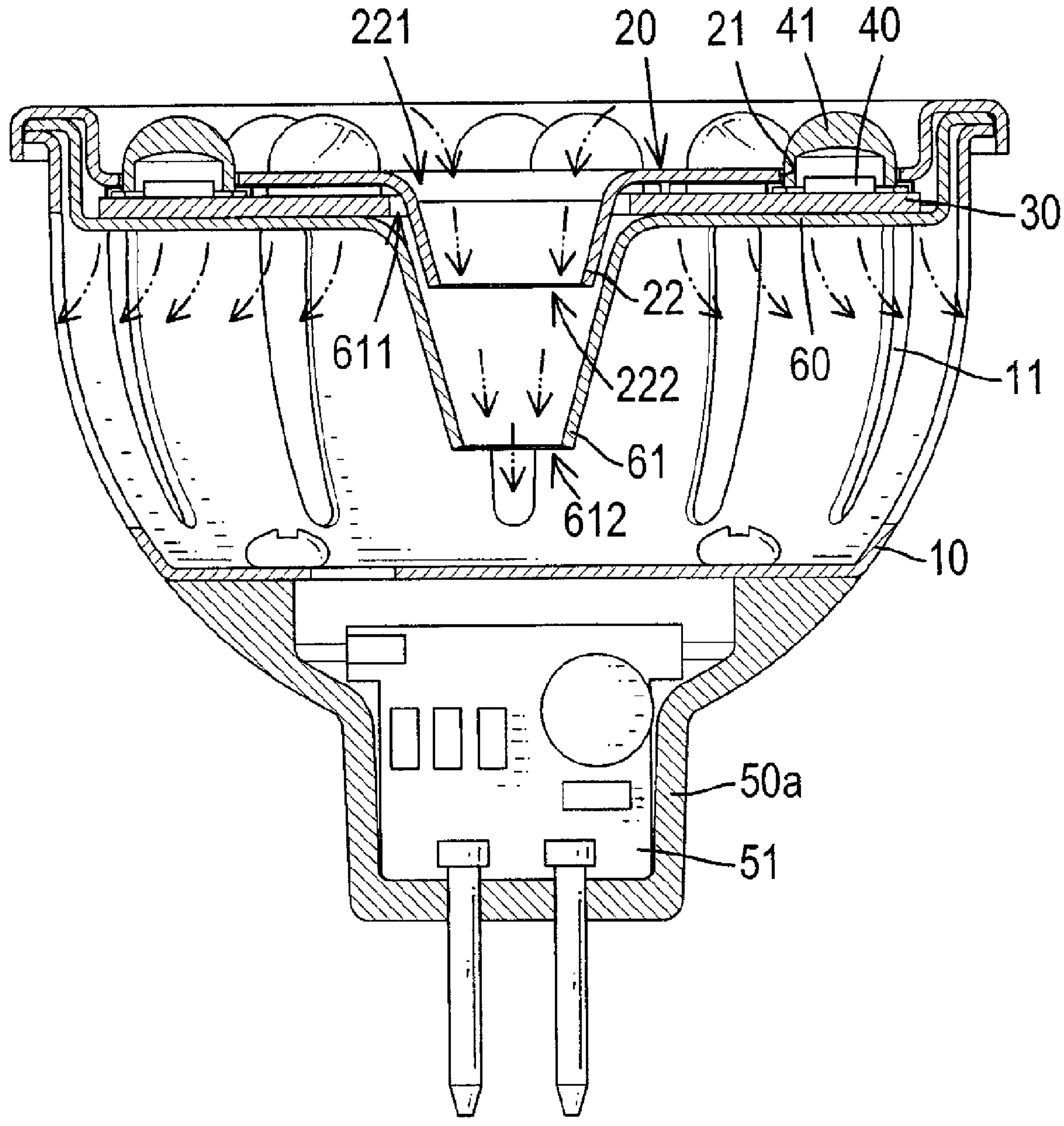
FIG. 3 is an operational side view in partial section of the LED lighting device in FIG. 2.
Figure 4:
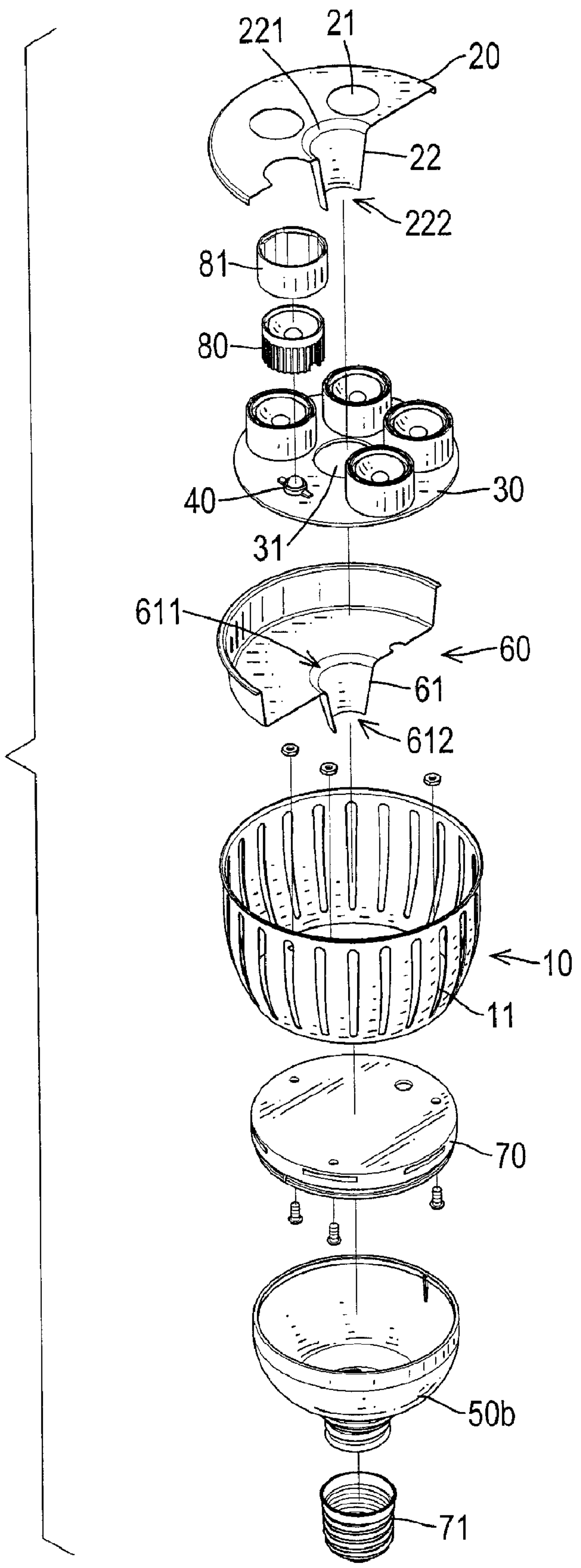
FIG. 4 is an exploded perspective view of a second embodiment of an LED lighting device in accordance with the present invention.

With further reference to FIG. 3, the exterior and interior flue (22, 61) increase efficiency by inducing the stack effect. The stack effect is a driven by a difference in air density. In detail, when the LEDs (40) light up and generate heat near the outer cover (20), the temperature at the outer open end (221) of the exterior flue (22) will be higher than at the inner open end (222). Therefore air density at the outer open end (221) of the exterior flue (22) is lower than at the inner open end (222) of the exterior flue (22). Buoyancy thus relatively occurs and continually forces the air at the outer open end (221) to directionally move into the exterior flue (22) and flow out of the housing (10) via the air holes (11). Directional heat convection of the LED lighting device will be better than nondirectional convection for heat-dissipating efficiency.

Furthermore, when the heat dissipating assembly is metallic, like being made of aluminum, heat conduction will further help improving the heat-dissipating efficiency.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An LED lighting device having heat convection and heat conduction effects comprising:

- a heat dissipating assembly having
  - a housing being heat conductive and having an open top, a bottom and multiple air holes being formed through the housing;
  - an outer cover being heat conductive and mounted on the open top of the housing and having
    - multiple through holes; and
    - an exterior flue protruding from the outer cover and extending into the housing and having
      - an outer open end being formed through the outer cover; and
      - an inner open end being opposite to the outer open end and extending toward the bottom of the housing;
- a substrate being mounted inside the housing, being disposed against the outer cover and having a hole being formed through the substrate, corresponding to the outer open end of the outer cover and being mounted around the exterior flue of the outer cover;
- multiple LEDs being mounted on the substrate and respectively corresponding to the through holes of the outer cover; and
- a base being attached to the bottom of the housing.

2. The LED lighting device having heat convection and heat conduction effects as claimed in claim 1, wherein each LED has a lens being mounted on the LED and aligning with a corresponding through hole of the outer cover.

3. The LED lighting device having heat convection and heat conduction effects as claimed in claim 1, wherein the LED lighting device further has a control module being mounted in the base and having two pins extending through the base.

4. The LED lighting device having heat convection and heat conduction effects as claimed in claim 1, wherein

- the base has an inner side and an outer side;
- the LED lighting device further has
  - a converter being mounted on the inner side of the base between the base and the bottom of the housing and powering the LEDs; and
  - a contact cap being mounted on the outer side of the base, electrically connecting to the converter and being adapted to connect an external power source.

5. The LED lighting device having heat convection and heat conduction effects as claimed in claim 1, wherein the LED lighting device further comprises multiple condensers being respectively mounted around the LEDs and each condenser having a shell being mounted around the condenser and on the substrate.

6. The LED lighting device having heat convection and heat conduction effects as claimed in claim 1, wherein

- the heat dissipating assembly further has an inner cover being mounted in the housing, being connected to the outer cover and having
  - an interior flue protruding from the inner cover, being mounted around the exterior flue of the outer cover and having
    - an outer open end being formed through the inner cover and corresponding to the outer open end of the exterior flue; and
    - an inner open end being opposite to the outer open end of the inner cover and extending toward the bottom of the housing; and
- the substrate is mounted between the outer cover and the inner cover.

7. The LED lighting device having heat convection and heat conduction effects as claimed in claim 2, wherein

- the heat dissipating assembly further has an inner cover being mounted in the housing, being connected to the outer cover and having
  - an interior flue protruding from the inner cover, being mounted around the exterior flue of the outer cover and having
    - an outer open end being formed through the inner cover and corresponding to the outer open end of the exterior flue; and
    - an inner open end being opposite to the outer open end of the inner cover and extending toward the bottom of the housing; and
- the substrate is mounted between the outer cover and the inner cover.

8. The LED lighting device having heat convection and heat conduction effects as claimed in claim 3, wherein

- the heat dissipating assembly further has an inner cover being mounted in the housing, being connected to the outer cover and having
  - an interior flue protruding from the inner cover, being mounted around the exterior flue of the outer cover and having
    - an outer open end being formed through the inner cover and corresponding to the outer open end of the exterior flue; and an inner open end being opposite to the outer open end of the inner cover and extending toward the bottom of the housing; and the substrate is mounted between the outer cover and the inner cover.

9. The LED lighting device having heat convection and heat conduction effects as claimed in claim 4, wherein the heat dissipating assembly further has an inner cover being mounted in the housing, being connected to the outer cover and having an interior flue protruding from the inner cover, being mounted around the exterior flue of the outer cover and having an outer open end being formed through the inner cover and corresponding to the outer open end of the exterior flue; and an inner open end being opposite to the outer open end of the inner cover and extending toward the bottom of the housing; and the substrate is mounted between the outer cover and the inner cover.

10. The LED lighting device having heat convection and heat conduction effects as claimed in claim 5, wherein the heat dissipating assembly further has an inner cover being mounted in the housing, being connected to the outer cover and having an interior flue protruding from the inner cover, being mounted around the exterior flue of the outer cover and having an outer open end being formed through the inner cover and corresponding to the outer open end of the exterior flue; and an inner open end being opposite to the outer open end of the inner cover and extending toward the bottom of the housing; and the substrate is mounted between the outer cover and the inner cover.

11. The LED lighting device having heat convection and heat conduction effects as claimed in claim 2, wherein the lenses of the LEDs respectively extend into the through holes of the outer cover.

12. The LED lighting device having heat convection and heat conduction effects as claimed in claim 1, wherein the housing and the outer cover are metallic.

13. The LED lighting device having heat convection and heat conduction effects as claimed in claim 6, wherein the housing, the outer cover and the inner cover are metallic.

14. The LED lighting device having heat convection and heat conduction effects as claimed in claim 1, wherein the housing is made of aluminum.

15. The LED lighting device having heat convection and heat conduction effects as claimed in claim 6, wherein the housing, the outer cover and the inner cover are made of aluminum.

16. A heat-dissipating assembly having heat convection and heat conduction effects comprising:

a housing having an open top, a bottom and multiple air holes being formed through the housing;

an outer cover being mounted on the open top of the housing and having multiple through holes; and an exterior flue protruding from the outer cover and extending into the housing and having an outer open end being formed through the outer cover; and an inner open end being opposite to the outer open end and extending toward the bottom of the housing; and an inner cover being mounted in the housing, being connected to the outer cover and having an interior flue protruding from the inner cover, being mounted around the exterior flue of the outer cover and having an outer open end being formed through the inner cover and corresponding to the outer open end of the exterior flue; and an inner open end being opposite to the outer open end of the inner cover and extending toward the bottom of the housing.

17. The heat-dissipating assembly having heat convection and heat conduction effects as claimed in claim 16, wherein the housing and the outer cover are made of aluminum.

18. The heat-dissipating assembly having heat convection and heat conduction effects as claimed in claim 16, wherein the housing, the outer cover and the inner cover are made of aluminum.

* * * * *